US012716515B2

(12) United States Patent
Bartoli et al.

(10) Patent No.: US 12,716,515 B2
(45) Date of Patent: Aug. 25, 2026

(54) HYDRAULIC SMART VALVE

(71) Applicant: DPC HYDRAULICS S.R.L., Reggio Emilia (IT)

(72) Inventors: Maurizio Bartoli, Reggio Emilia (IT); Stefano Fasano, Reggio Emilia (IT)

(73) Assignee: DPC HYDRAULICS S.R.L., Reggio Emilia (IT)

( * ) Notice: Subject to any disclaimer, the term of this patent is extended or adjusted under 35 U.S.C. 154(b) by 0 days.

(21) Appl. No.: 18/669,952

(22) Filed: May 21, 2024

(65) Prior Publication Data

US 2025/0361949 A1 Nov. 27, 2025

(51) Int. Cl.
*F16K 31/06* (2006.01)
*F15B 13/044* (2006.01)
*F16K 37/00* (2006.01)
*G01B 7/00* (2006.01)
*F15B 19/00* (2006.01)

(52) U.S. Cl.
CPC ...... *F16K 31/0613* (2013.01); *F15B 13/0442* (2013.01); *F16K 37/0041* (2013.01); *G01B 7/003* (2013.01); *F15B 19/002* (2013.01)

(58) Field of Classification Search
CPC .... G01B 7/003; G01M 13/003; F15B 19/007; F15B 19/005; F15B 19/002; F15B 20/008; F15B 13/0442; F16K 31/42; F16K 17/36
See application file for complete search history.

(56) References Cited

U.S. PATENT DOCUMENTS 5,942,892 A 8/1999 Li
7,511,478 B2 3/2009 Ganev
10,876,277 B1 * 12/2020 Fatehi .................. F16K 17/363
2007/0030619 A1 2/2007 Ganev
2008/0191826 A1 8/2008 Keller et al.
2020/0011449 A1 * 1/2020 Jagoda .................... F16K 31/42
2020/0357552 A1 * 11/2020 Suzuki .................. F15B 21/008
2025/0093083 A1 * 3/2025 Jacubasch ........... F16K 37/0041

FOREIGN PATENT DOCUMENTS

DE 19910497 A1 9/2000
DE 102005018012 A1 10/2006
DE 102007034768 A1 1/2009

OTHER PUBLICATIONS

"CompAct Technology," GW Lisk Website, Available Online at https://www.gwlisk.com/solutions/compact-technology/, Available as Early as Sep. 28, 2021, 4 pages.

* cited by examiner

*Primary Examiner* — Kelsey E Cary
(74) *Attorney, Agent, or Firm* — McCoy Russell LLP

(57) ABSTRACT

Methods and systems are herein provided for a hydraulic smart valve. In one example, a hydraulic valve system comprises a hydraulic solenoid valve comprising a valve body and a spool; a bi-directional actuator; and a controller with instructions stored thereon to determine a position of the spool via inductance variance of the bi-directional actuator.

17 Claims, 7 Drawing Sheets

200
208
212
214
215
204
202
218
220
216
210
206

HYDRAULIC SMART VALVE

TECHNICAL FIELD

Embodiments of the subject matter disclosed herein relate to hydraulic valves, and more particularly to a hydraulic smart valve.

BACKGROUND AND SUMMARY

A hydraulic solenoid valve is a solenoid controlled directional control valve used in a hydraulic system for opening, closing, or changing direction of flow of a liquid in the system. The valve operates with one or more solenoids. Solenoids are electromagnets formed by a helical coil of wire that generates a controlled magnetic field. When actuated, the solenoids slide a spool of the valve to open respective ports of the directional control valve. The spool either blocks or allows flow through the various ports of the directional control valve and the one or more solenoids control the position of the spool. Hydraulic solenoid valves are widely used in industries like manufacturing, aerospace, construction, automotive, and many others. In particular, hydraulic solenoid valves are often utilized in transmission systems, vehicle powertrains, and the like to manage operation and supply of oil throughout the systems.

Hydraulic solenoid valves with 4 positions and 3 ways (4/3-way valves) are usually driven by two solenoids, or push magnet actuators. The spool of the valve is held in a central neutral position via two springs, one on each end of the valve. The push magnet actuators alter the position of the spool to allow flow through the different ports of the valve. The position of the spool is monitored by a dedicated sensor, which is included as a component in the hydraulic solenoid valve. The sensor is read by a reading element that is connected with the spool and moves with it. The addition of the sensor and the reading element not only adds bulk and increased dimensions to the valve, but also the movement of the reading element with the spool may increase hysteresis, increase weight of the valve, and reduce working sensitivity of the valve The inventors herein have recognized the aforementioned issues and developed a hydraulic smart valve that includes only one bi-directional solenoid actuator. The hydraulic valve as herein presented may detect spool position by the means of variation in inductance. Using variation in inductance for determining spool position in solenoid is known in the art. As an example, German Patent No. DE19910497A1 describes a method for determining position of a magnet mounted in a coil via measurement of differential inductance and U.S. Pat. No. 7,511,478 B2 describes a sensorless position measurement method for solenoid-based actuation devise using inductance variance.

The hydraulic valve of the present disclosure includes a directional control valve with a spool and a body valve that is actuated by a bi-directional solenoid actuator. The bi-directional magnet actuator is configured for both push and pull linear movement such that the single actuator can move the valve into any position. The hydraulic valve also includes a circuit for measuring inductance variance and a controller. The controller is or otherwise includes a proportional-integral-derivative (PID) controller configured to convert the determined inductance variance to a spool position based on one or more characteristics determined by the controller, including time delay of transistor overvoltage decay and waveform of the transistor overvoltage decay. The values of the characteristics are compared to reference values with known spool positions stored in memory of the controller in order to determine spool position of the valve at a given time. Thus, via inductance variance, the position of the spool can be determined. As the hydraulic valve does not include a position sensor and thus does not include a reading element, hysteresis of the valve may be reduced. Further, the overall weight and dimensions of the valve may be reduced.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems for a hydraulic smart valve. An example of a typical hydraulic solenoid valve is presented in a hydraulic diagram in FIG. 1 and a detailed cross-section in FIG. 2. The hydraulic smart valve of the present disclosure is presented in a hydraulic diagram in FIG. 3 and a detailed cross-section in FIG. 4. As will be described herein, the hydraulic smart valve includes a bi-directional solenoid actuator rather than two push actuators of the conventional example. Further, the positioned of the spool is determined via inductance variation rather than via a sensor and sensor reading element.

Figure 2:
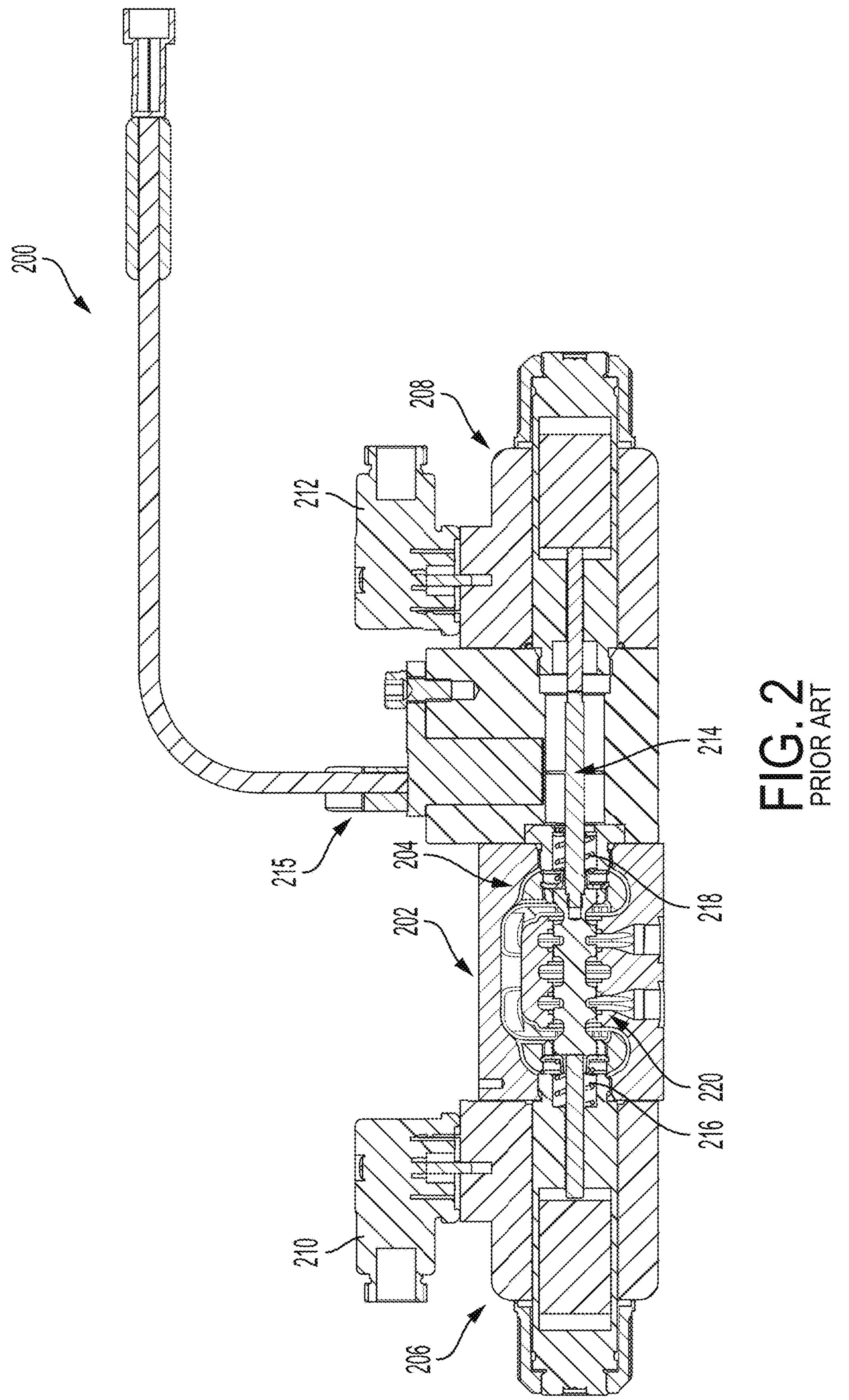
FIG. 2 shows a cross-section of a conventional hydraulic solenoid valve.
Figure 4:
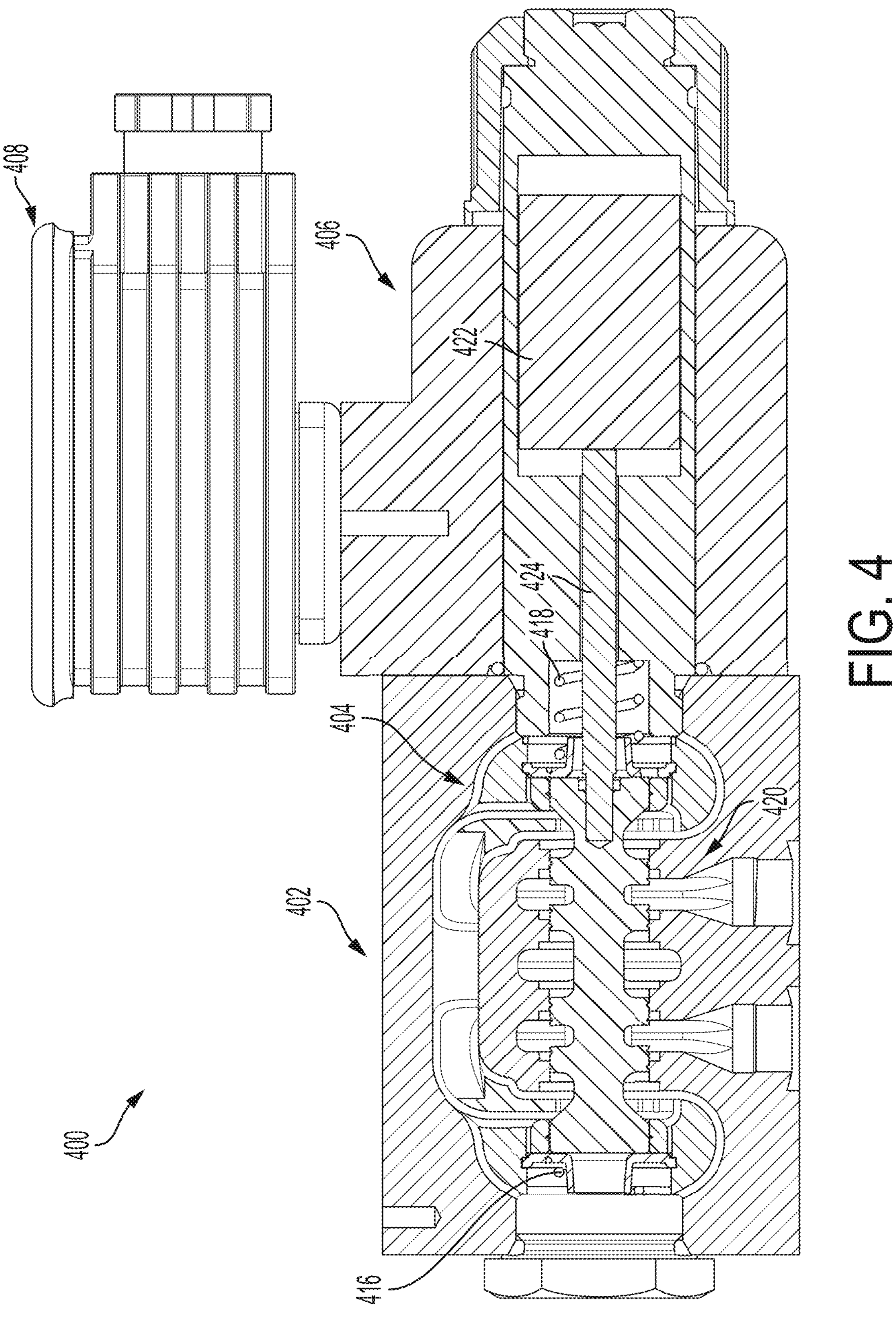
FIG. 4 shows a cross-section of a hydraulic solenoid valve according to an embodiment of the present disclosure.

FIGS. 2 and 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
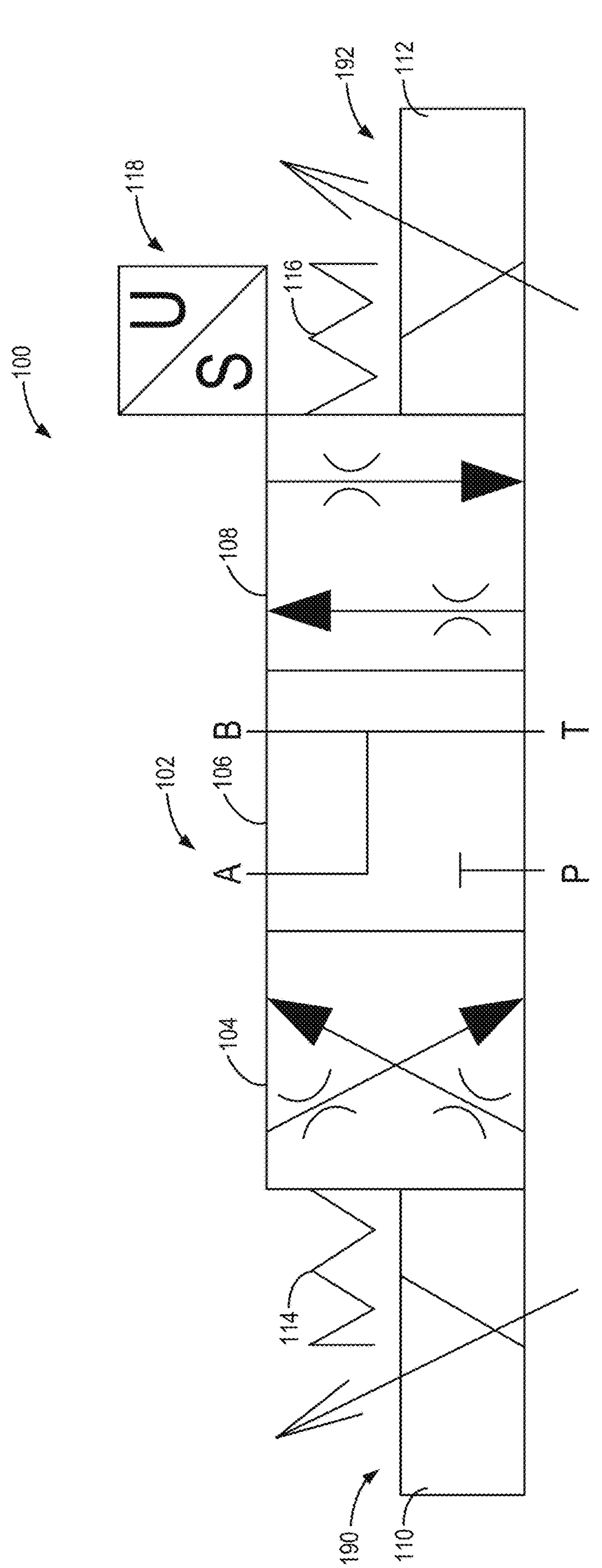
FIG. 1 shows a hydraulic schematic of a conventional hydraulic solenoid valve.

Starting with FIG. 1, an example of a conventional hydraulic solenoid valve 100 is shown. The hydraulic solenoid valve 100 may be incorporated in any number of systems for control of fluid flow, including in vehicle transmission systems, suspension systems, and brake systems, as well as in various other applications such as machine tools, aerospace systems, power plants, and more.

The conventional hydraulic solenoid valve 100 as depicted comprises a directional control valve 102. The directional control valve 102 may be a four-way, three-position directional control valve (e.g., 4/3 valve) and as such the diagram thereof comprises a first flow box 104, a second flow box 106, and a third flow box 108 depicting the various flow paths through the directional control valve 102. The first flow box 104 may correspond to a first position, the second flow box 106 may correspond to a center position (e.g., second position), and the third flow box 108 may correspond to a third position. The second flow box 106 depicts the four ports of the directional control valve 102, including a pressure port P, a tank or return port T, a first actuator port A, and a second actuator port B. The first flow box 104 depicts a first set of internal passages and the third flow box 108 depicts a second set of internal passages that guide flow of hydraulic fluid based on the position of the spool. For example, the first set of internal passages of the first flow box 104 correspond to a first position of the directional control valve 102 and the second set of internal passages of the third flow box 108 correspond to a third position of the directional control valve 102. The second position of the directional control valve 102 may be a neutral position.

The center of the directional control valve 102 (e.g., the second flow box 106 of the diagram) is shown in FIG. 1 as a float center, in which the pressure port P is blocked but the tank port T remains open with the first and second actuator ports A and B when the directional control valve 102 is in the second, centered position. It should be understood however that in other examples, the center of the directional control valve 102 may have other configurations, such as closed, open, or tandem configurations, depending upon end application.

Each of the flow passages depicted in the diagram in FIG. 1 are restricted passages, whereby flow rate is controlled as it passes through the passage. However, it should be understood that in other examples, flow through one or more of the passages of the directional control valve 102 may not be restricted by flow restrictors.

The hydraulic solenoid valve 100 as herein presented may be a spring centered valve such that the directional control valve 102 is in the central, neutral position when no actuators are actuated. A first spring 114 may be positioned on a first side 190 of the directional control valve and a second spring 116 may be positioned on a second side 192 of the directional control valve 102. The first and second springs 114, 116, when extended may hold the directional control valve 102 in the central, closed position (e.g., the second position). The first and second springs 114, 116 may be compressed via actuation of a respective actuator.

The hydraulic solenoid valve 100 may comprise a first actuator 110 positioned at the first side 190 of the directional control valve 102 and a second actuator 112 positioned at the second side 192 of the directional control valve 102. The first and second actuators 110, 112 may be electromagnetically actuated solenoids, push magnet actuators, push solenoids, or other device used to change the linear position of the directional control valve 102. When the first actuator 110 is actuated, the second spring 116 may compress and the directional control valve 102 may move into the first position. When the second actuator 112 is actuated, the first spring may compress and the directional control valve 102 may move into the third position.

The hydraulic solenoid valve 100 may further comprise a sensor 118. The sensor 118 may be a position sensor that is configured to sense the position of the directional control valve 102, for example whether the valve is in the first position, center/second position, or the third position. The sensor 118 may be read by a reading element, in some examples, as will be further described below. The reading element may be a magnet, a pin, or other type of element that the sensor may detect. The reading element for the sensor 118, and in some examples the sensor 118, may be connected with the directional control valve 102 (e.g., with the spool) and may move with the directional control valve 102 as it changes positions based on actuation of the actuators. Thus, the presence of the sensor 118 and the reading element may result in increased dimensions and weight of the valve, increased hysteresis, and reduced working sensitivity of the valve. Hysteresis, in this context, is the phenomenon where the position of the valve does not immediately follow changes in the controlling input, rather there is a delay or lag in the response. Hysteresis has implications for accuracy and precision of control in hydraulic systems, thereby affecting system performance.

Turning now to FIG. 2, an example of a conventional hydraulic solenoid valve 200 is shown. The hydraulic solenoid valve 200 may be the same as the hydraulic solenoid valve 100 depicted in the diagram in FIG. 1, in some examples. The hydraulic solenoid valve 200 may comprise a valve body 202 and a spool 204. The spool 204 may be within the valve body 202 and move linearly (e.g., laterally) therewithin. The valve body 202 and the spool 204 may be diagrammatically represented as the directional control valve 102 in FIG. 1. The spool 204 may comprise a plurality of valves and ports 220. Each of the vales may provide a flow path for hydraulic oil in one of three positions of the valve. The ports, as previously noted, may comprise a pressure port, a tank port, a first actuator port, and a second actuator port, in examples in which the hydraulic solenoid valve 200 is a 4-way valve.

The spool 204 may be in a first position, a second, central position, or a third position, as previously noted. The second, central position may be a neutral position. The position of the spool 204 may be controlled via a first actuator 206 and a second actuator 208, as well as a first spring 216 and a second spring 218. The first spring and second springs 216, 218 may be either extended or compressed. When both the first and second springs 216, 218 are extended, as is shown in FIG. 2, neither of the first or second actuators 206, 208 may be actuated and the spool 204 may be in the second, central, neutral position. As previously described, when the first actuator 206 actuates to move the spool 204 into the first position, the second spring 218 may be compressed and when the second actuator 208 actuates to move the spool 204 into the third position, the first spring 216 may be compressed. The first and second actuators 206, 208 may be linear actuators such as push solenoids configured to alter the linear position of the spool 204.

The hydraulic solenoid valve 200 may additionally comprise a reading element 214, such as a pin or magnet. The reading element 214 may move when the spool 204 moves, for example upon actuation of one of the first or second actuators 206, 208. The reading element 214 may indicate to a sensor 215 a position of the spool 204. The sensor 215 and the reading element 214 may increase the overall dimensions of the valve as well as the weight of the valve. Further, hysteresis may be increased due to the increased weight and additional component that is the reading element 214.

The hydraulic solenoid valve 200 may further comprise one or more connectors, including a first connector 210 and a second connector 212, in some examples. The one or more connectors may be configured to connect the hydraulic solenoid valve 200 to the hydraulic system in which it is incorporated. The one or more connectors may be configured in fluid communication with one or more ports of the valve body, in some examples.

Figure 3:
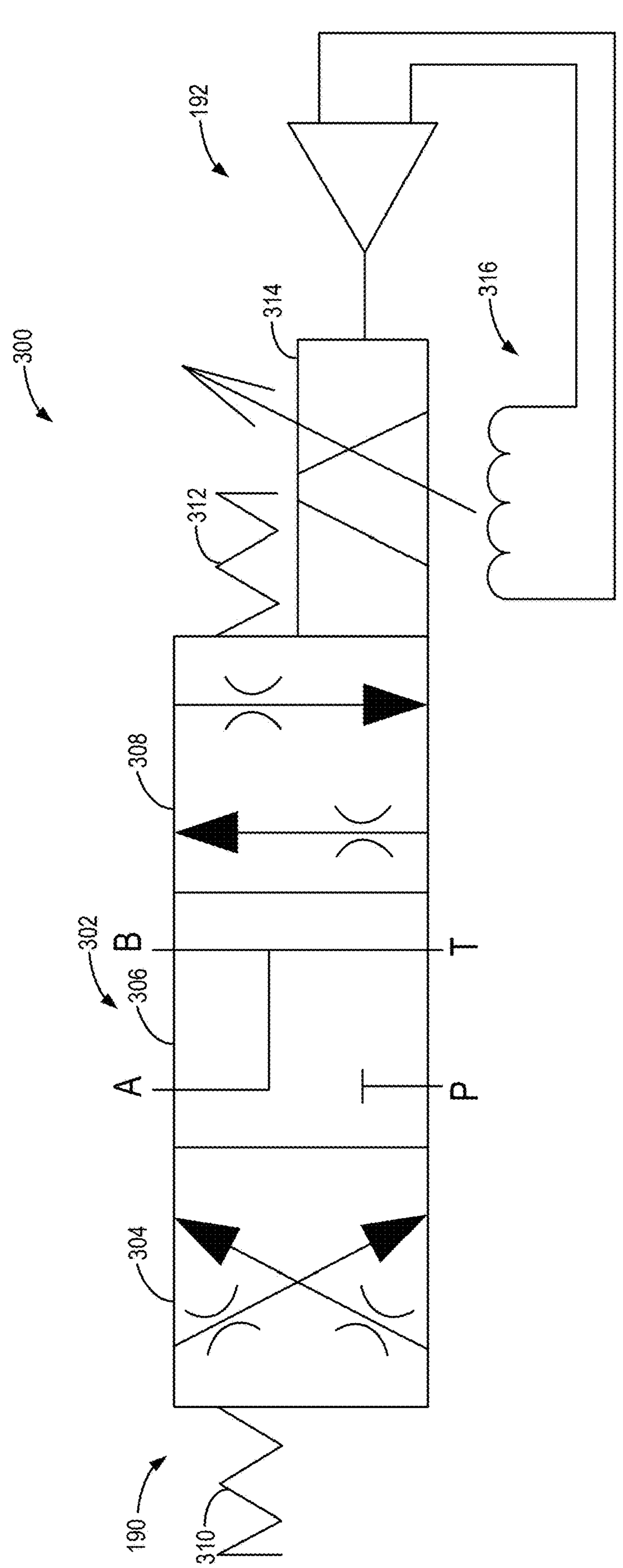
FIG. 3 shows a hydraulic schematic of a hydraulic solenoid valve according to an embodiment of the present disclosure.

FIGS. 3 and 4 show a hydraulic smart valve according to the present disclosure is shown that at least partially addresses the issues identified with the aforementioned conventional hydraulic solenoid valve. As will be described, the hydraulic smart valve may include a bi-directional solenoid actuator wherein a position of the spool is determine based on inductance variation in the bi-directional solenoid actuator. Turning to FIG. 3, a hydraulic schematic of a hydraulic solenoid valve 300 is shown. The hydraulic solenoid valve 300 may be incorporated in any number of systems for control of fluid flow, including in vehicle transmission systems, suspension systems, and brake systems, as well as in various other applications such as machine tools, aerospace systems, power plants, and more. As a non-limiting example, the hydraulic valve of the present disclosure may be configured for a loader or drilling machine. The hydraulic valve may be situated within such a machine in a position that is difficult to access. Determining spool position may be included as a monitoring step for implementation of fault detection to reduce maintenance demands.

The hydraulic solenoid valve 300 as depicted may comprise a four-way, three-position directional control valve 302. As such, the diagram thereof comprises a first flow box 304, a second flow box 306, and a third flow box 308 depicting the various flow paths through the directional control valve 302. The first flow box 304 may correspond to a first position, the second flow box 306 may correspond to a center position (e.g., second position), and the third flow box 308 may correspond to a third position. The second flow box 306 depicts the four ports of the directional control valve 302, including a pressure port P, a tank or return port T, a first actuator port A, and a second actuator port B. The first flow box 304 depicts a first set of internal passages and the third flow box 308 depicts a second set of internal passages that guide flow of hydraulic fluid based on the position of the spool. For example, the first set of internal passages of the first flow box 304 correspond to the first position of the directional control valve 302 and the second set of internal passages of the third flow box 308 correspond to the third position of the directional control valve 302. The second position of the directional control valve 302 may be a neutral position.

The center of the directional control valve 302 (e.g., the second flow box 306 of the diagram) is shown in FIG. 3 as a float center, in which the pressure port P is blocked but the tank port T remains open with the first and second actuator ports A and B when the directional control valve 302 is in the second, centered position. It should be understood however that in other examples, the center of the directional control valve 302 may have other configurations, such as closed, open, or tandem configurations, depending upon end application.

Each of the flow passages depicted in the diagram in FIG. 3 are restricted passages, whereby flow rate is restricted by a restrictor as it passes through the passage. However, it should be understood that in other examples, flow through one or more of the passages of the directional control valve 302 may not be restricted by flow restrictors.

The hydraulic solenoid valve 300 as herein presented may be a spring centered valve such that the directional control valve 302 is in the central, neutral position when an actuator is not actuated. A first spring 310 may be positioned on the first side 190 of the directional control valve 302 and a second spring 312 may be positioned on the second side 192 of the directional control valve 302. The first and second springs 310, 312, when extended, may hold the directional control valve 302 in the central, neutral position (e.g., the second position). The first and second springs 310, 312 may be compressed via actuation of a respective actuator.

The hydraulic solenoid valve 300 may comprise a bi-directional solenoid actuator 314. The bi-directional solenoid actuator 314 may be configured to produce bi-directional force or linear movement. In this way, the bi-directional solenoid actuator 314 may move the directional control valve 302 into all of the first position, the second position, and the third position on its own. In some examples, the bi-directional solenoid actuator 314 may utilize embedded magnets to produce this bidirectional movement. The magnets may be integrated within the actuator structure itself and may interact with other magnetic elements or fields to generate the desired movement. In other examples, the bi-directional solenoid actuator 314 may utilize an H-bridge circuit driven by input pulse width modulation in order to generate push and pull movements, as is described with respect to FIG. 7. The bi-directional solenoid actuator 314 may also comprise armature which has inductance, which is a measure of the ability of the armature winding to store energy in the form of a magnetic field when current flows through it. The bi-directional solenoid actuator 314 may further comprise a core or plunger that when the actuator is actuated via a pulse, the plunger moves to change the position of the spool of the valve.

When the bi-directional solenoid actuator 314 actuates the directional control valve to move into the first position from neutral, the second spring 312 may compress. When the bi-directional solenoid actuator 314 actuates the directional control valve to move into the third position from neutral, the first spring 310 may compress.

An inductance measuring circuit 316 may be in communication with the bi-directional solenoid actuator 314. The inductance measuring circuit 316 may be configured to determine variance in inductance of the bi-directional solenoid actuator 314 during a turn off pulse of current resulting from actuation voltage. A stroke point of the armature of the actuator may inform determination of variance. For example, the inductance of the armature (e.g., coil) is influenced by the embedded magnet or ferromagnetic components within the solenoid. As the embedded magnet or ferromagnetic components move within the armature, such as when the solenoid is energized, the magnetic properties of the armature change, thereby leading to changes in inductance. The position of the valve is associated with the position of the core or plunger of the actuator. For example, the inductance of the armature is influence by the position of the core or plunger. As the core moves within the coil, it alters the magnetic properties of the coil, leading to changes in inductance.

The variance in inductance can be determined via the circuit 316 by current monitoring, electrical impedance changes, or analysis of current ripple. For example, as is further explained with respect to FIGS. 5 and 6, overvoltage decay characteristics may be determined based on resistance variation during a turn-on phase.

Turning to FIG. 4, a cross-section of a hydraulic solenoid valve 400 is shown. The hydraulic solenoid valve 400 may be the hydraulic solenoid valve 300 presented in the diagram of FIG. 3. The hydraulic solenoid valve 400 may comprise a valve body 402 and a spool 404. The spool 404 may be positioned within the valve body 402 and may move linearly (e.g., laterally) therewithin The valve body 402 and the spool 404 may be diagrammatically represented as the directional control valve 302 in FIG. 3. The spool 404 may comprise a plurality of valves and ports 420. Each of the vales may provide a flow path for hydraulic oil in one of three positions of the valve. The ports, as previously noted, may comprise a pressure port, a tank port, a first actuator port, and a second actuator port, in examples in which the hydraulic solenoid valve 400 is a 4-way valve.

The spool 404 may be in a first position, a second, central position, or a third position, as previously noted. The second, central position may be a neutral position. The position of the spool 404 may be controlled a bi-directional solenoid actuator 406 (e.g., the bi-directional solenoid actuator 314 of FIG. 3), as well as a first spring 416 and a second spring 418. The first spring and second springs 416, 418 may be either extended or compressed. When both the first and second springs 416, 418 are extended, as is shown in FIG. 4, the spool 204 may be in the second, central, neutral position. The spool 404 may be connected to a plunger 422 via a pin 424. The plunger 422 may be actuated to move via the bi-directional solenoid actuator 314, which may move the pin 424 which in turn may move the spool 404 and thereby compress a given spring. As previously described, when the bi-directional solenoid actuator 406 actuates to move the spool 404 into the first position, the second spring 418 may be compressed and when the bi-directional solenoid actuator 406 actuates to move the spool 404 into the third position, the first spring 416 may be compressed.

The hydraulic solenoid valve 400 may additionally comprise a controller 408. The controller 408 may include instructions stored thereon to determine the position of the spool based on the inductance variance of the bi-directional actuator. The controller 408 may include a proportional-integral-derivative (PID) controller. The PID controller may be configured to convert the determined inductance variation into a position feedback of the spool 404. For example, the system may be calibrated to determine a relationship between the measured changes in inductance and the actual position of the valve. The PID controller may thus close the loop in position to reduce hysteresis of the valve. In some examples the controller 408 may additionally comprise or otherwise communicate with a controller area network (CAN) BUS communication (not shown) therein that is configured to drive the valve in order to reduce the connection complexity and communicate to a user machine the state of the valve, including diagnostic information, predictive maintenance information, and the like. In some examples, an electronic card may be used instead of or in addition to the controller 408. For example, the circuit as described with respect to FIG. 3 may be included in the electronic card. In other examples, the controller 408 may be an electronic card that includes circuitry and other components.

In some examples, the controller 408 may comprise memory that stores instructions for executing one or more methods and reference data. For example, the reference data may include reference overvoltage decay characteristics for various inductance, spool position, and valve type scenarios. The reference data may be configured in a look up table for which determined overvoltage decay characteristics of the valve may be compared to, as will be further described below.

As a non-limiting example, the controller 408, when configured as an electronic card that includes circuitry, may comprise one or more transistors, such as metal-oxide-semiconductor field-effect transistors (MOSFETs), configured as power components that regulate current flow through windings of the valve in pulse width modulation. The transistors may be driven by drivers which, suitably controlled by signals coming from a microcontroller of the electronic card, drive the gate of the transistors with currents high enough to allow rapid switching on and off. The speed of shutdown (e.g., turning off) may depend on resistance values of resistors. The values of the resistors may be chosen for the given valve because the resistance values are directly involved in overvoltage following the shutdown. As will be described further below with respect to FIG. 6, the overvoltage may be evaluated using two different approaches corresponding to detection of two quantities using components of the electronic card (e.g., an analog-to-digital converter and a voltage comparator).

Figure 5:
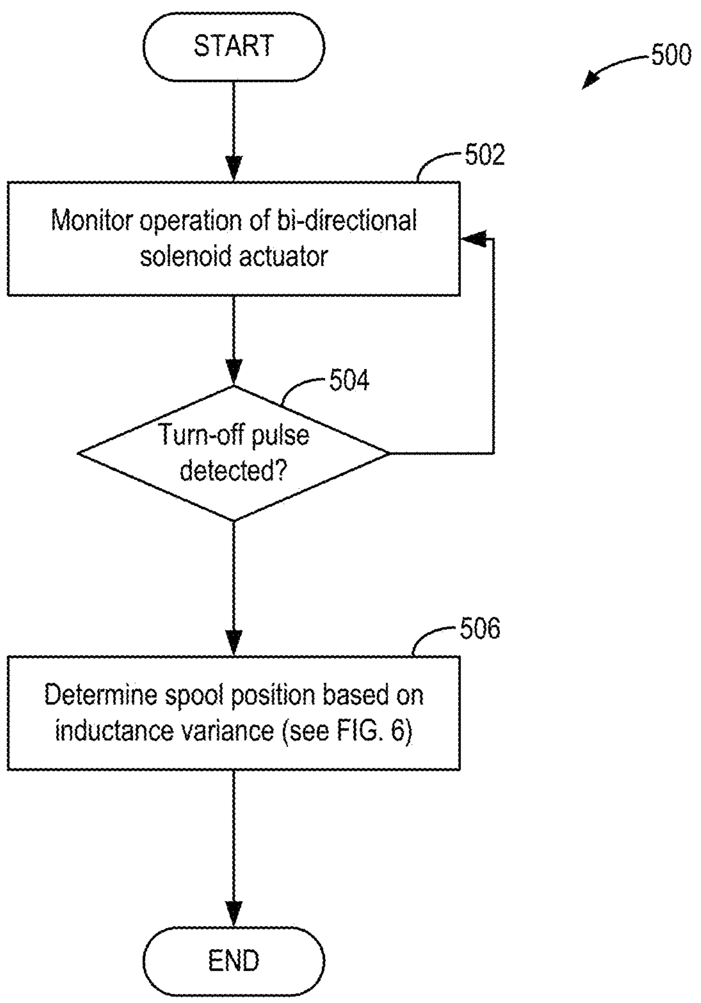
FIG. 5 shows a flowchart illustrating a method for determining a spool position of a hydraulic valve.

FIG. 5 shows a flowchart illustrating a method 500 for determining a position of a spool of a hydraulic valve according to the present disclosure. The hydraulic valve may be the hydraulic solenoid valve 300 and/or the hydraulic solenoid valve 400 discussed above with respect to FIGS. 3 and 4. The hydraulic valve may comprise a 4/3 directional control valve with the spool, a push-pull actuator configured for bi-directional linear movement of the spool (e.g., the bi-directional solenoid actuator 314), a circuit for measuring inductance, and a controller with a PID. The method 500 as herein presented may be executed by a processor of the controller according to instructions stored in non-transitory memory. The controller may also store and execute instructions for actuating the bi-directional solenoid actuator.

At 502, method 500 includes monitoring operation of the bi-directional solenoid actuator. As noted, the controller may control operation of the actuator, indicating turn on phases and turn off phases for push and pull movements. These push and pull movements may alter the position of the spool of the directional control valve. For example, the actuator may change the position of the spool from neutral to a first position, from a first position to neutral, from neutral to a third position, and so on.

At 504, method 500 includes determining whether a turn-off pulse has been detected. The turn-off pulse may be a brief electrical pulse applied to the actuator to deactivate the magnetic field generated by the embedded magnet. Applying a turn-off pulse may stop the current flow through the coil, resulting in deactivation of the magnetic field and cessation of the actuator's movement. If the turn-off pulse is detected, method 500 proceeds to 506. If the turn-off pulse is not detected, method 500 returns to 502 to continue monitoring operation of the actuator.

At 506, method 500 includes determining spool position based on inductance variance. The variance in inductance may be determined via the circuit, as discussed above. The variance may result from the movement of the actuator, and an amount of variance may indicate the current position of the spool dependent upon the stroke point. As will be explained further with respect to FIG. 6, the inductance variance may be used to determine spool position by comparing determined characteristics to reference information stored in the controller of the valve.

Figure 6:
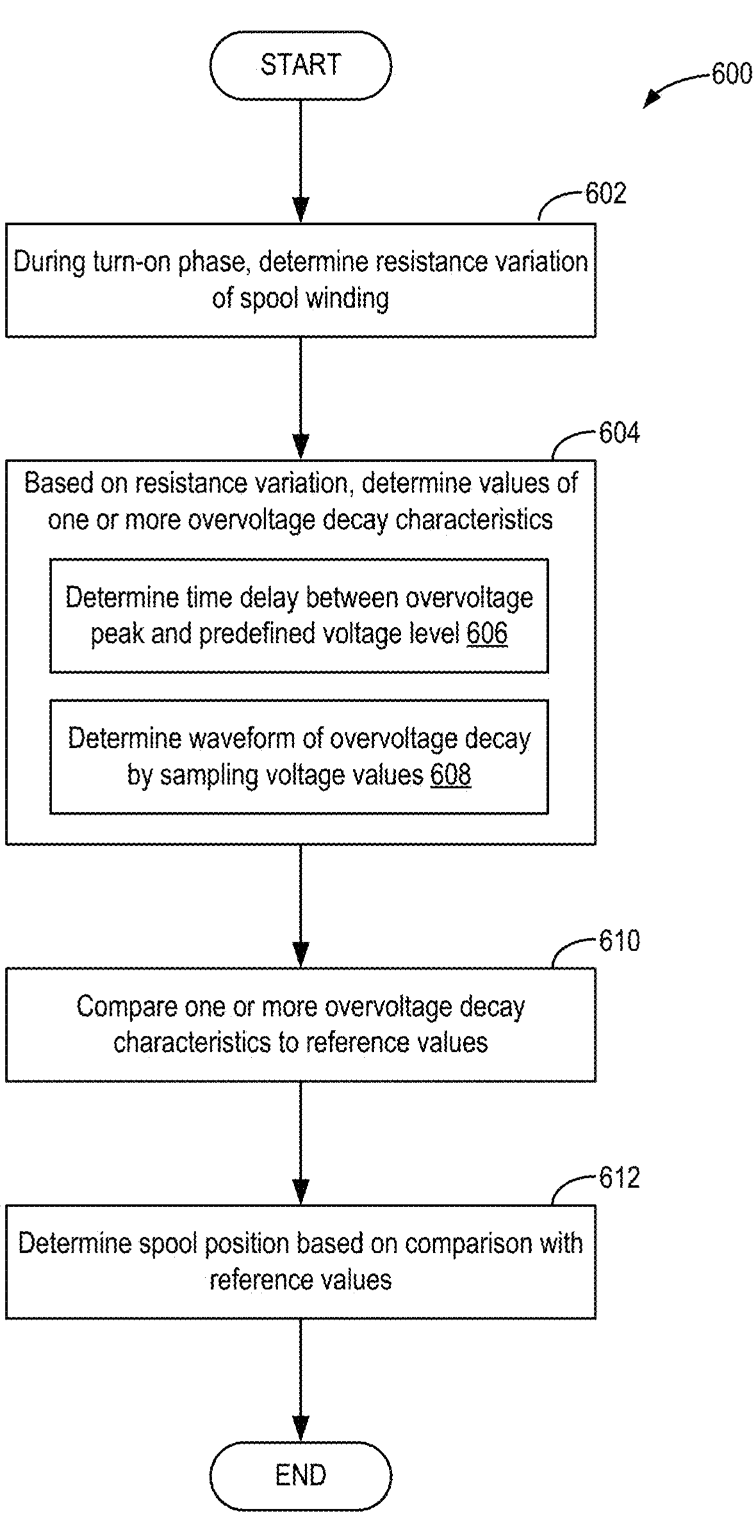
FIG. 6 shows a flowchart illustrating a method for determining inductance variance.

Turning now to FIG. 6, a flowchart illustrating a method 600 for determining spool position via inductance variance of a hydraulic valve is shown. The hydraulic valve may be the hydraulic solenoid valve 300 and/or the hydraulic solenoid valve 400 discussed above with respect to FIGS. 3 and 4. The hydraulic valve may comprise a 4/3 directional control valve with the spool, a push-pull actuator configured for bi-directional linear movement of the spool (e.g., the bi-directional solenoid actuator 314), a circuit for measuring inductance, and a controller with a PID. The method 500 as herein presented may be executed by a processor of the controller according to instructions stored in non-transitory memory. The controller may also store and execute instructions for actuating the bi-directional solenoid actuator.

At 602, method 600 includes determining resistance variation of spool winding during a turn-on phase of the solenoid. The resistance of the valve coil is calculated during turn-on phase by measuring its voltage and current. The resistance variation is used when evaluating overvoltage decay as overvoltage decay depends on the resistance variation.

At 604, method 600 includes determining values of one or more overvoltage decay characteristics based on the resistance variation. In solenoid systems, such as the bi-directional solenoid actuator of the hydraulic valve herein disclosed, the voltage across the solenoid coil decreases over time after an initial surge in voltage. When voltage is applied to the solenoid coil, a magnetic field is generated which causes the solenoid to actuate, in this instance to linearly move the spool of the hydraulic valve. However, once the solenoid reaches its desired state, the voltage across it tends to decrease gradually due to various factors, including resistance in the coil, inductance, and losses in the system. The overvoltage decay may have measurable characteristics, including timing of the decay, waveform patterns, and the like.

Determining values of the one or more overvoltage decay characteristics may include determining a time delay between an overvoltage peak (e.g., voltage at turn-off) and a predefined voltage level, as noted at 606. The time delay may be measured from the moment transistors of the controller (e.g., the transistors of controller 408) is turned off to the moment a certain threshold voltage value is reached. The time delay may be determined by output signals of a voltage comparator of the controller. The time interval between turn-off and crossing of the predefined voltage levels may depend on the valve position. Determining the values of the one or more overvoltage decay characteristics may also include determining a waveform of the overvoltage decay by sampling voltage values, as noted at 608. The waveform of the overvoltage decay may be detected by several voltage samples acquired by a digital-analog converter, for example as included in the controller, during the overvoltage decay transient period. Determining the waveform may include sampling, at intervals of approximately 2 or 3 microseconds, the trend of the overvoltage from the moment of maximum value until extinction. Thus, the controller of the valve may include the components demanded to measure the characteristics as well as to determine spool positions thereby.

At 610, method 600 includes comparing the one or more overvoltage decay characteristics to reference values. As noted, the overvoltage decay characteristics may include time delay between peak voltage (e.g., at transistor turn-off) and predefined voltage level as well as the waveform. These values are compared with values stored in non-volatile memory of the controller (e.g., the electronic board). In some examples, comparison may include applying a dedicated algorithm in order to extract a spool position from the determined characteristic values.

At 612, method 600 includes determining spool position based on comparison with reference values. As noted, reference values may be stored in memory of the controller. Each of the reference values may correspond to various spool positions. The comparison of the determined characteristic values to the reference values may thus indicate the spool position of the hydraulic valve at the given instant. The combination of the two characteristics as described above may allow for the estimation of spool position to be more accurate and precise than using only one of them.

Figure 7:
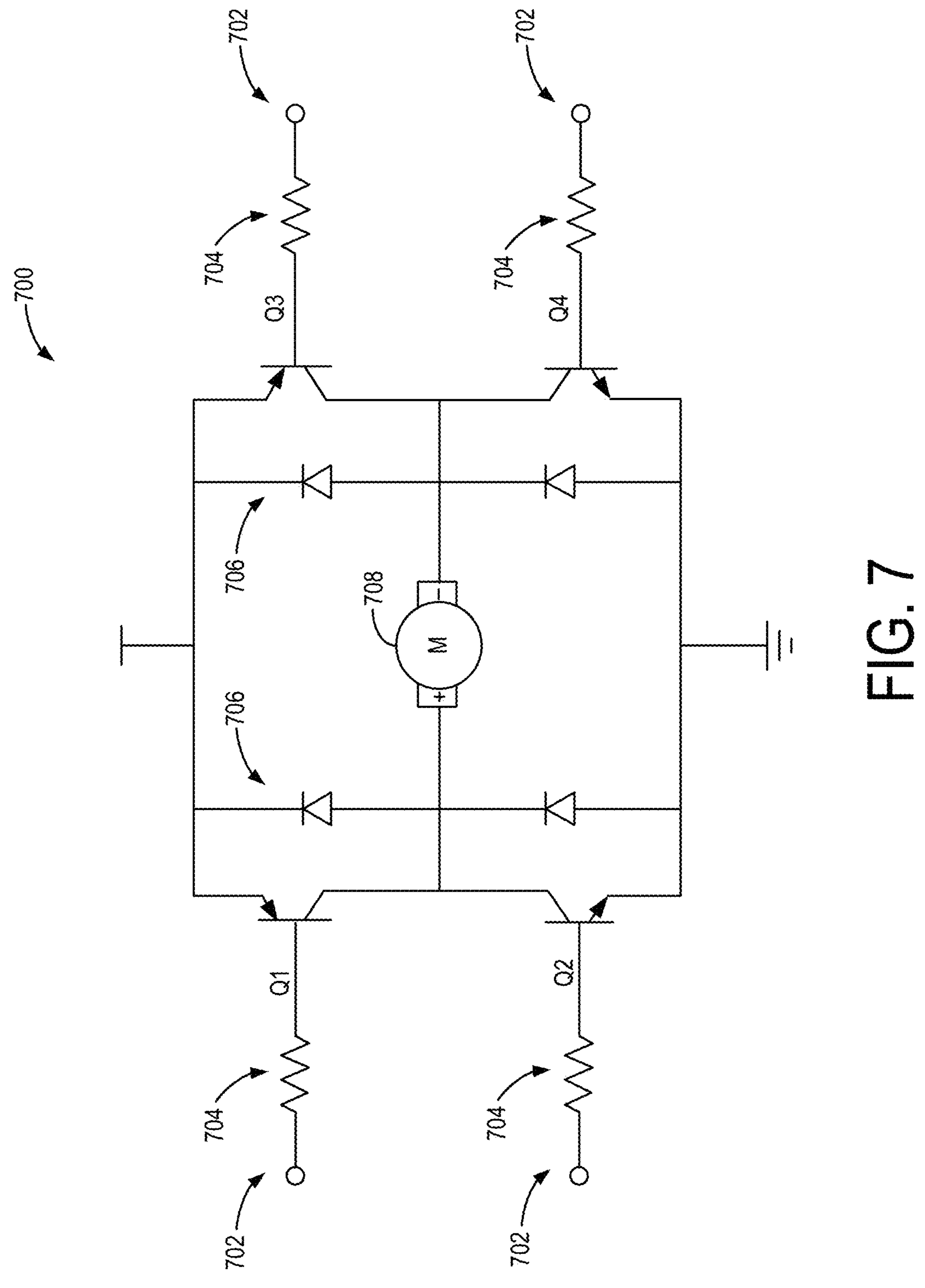
FIG. 7 shows an example H-bridge circuit.

FIG. 7 shows an example of an H-bridge circuit 700 as may be included in the bi-directional actuator of the hydraulic valve herein described. The H-bridge circuit 700 may include a plurality of transistors switching elements 702, labeled Q1-Q4 in FIG. 7, resistors 704, diodes 706, and a motor 708. The switching elements may be bi-polar or FET transistors. Turning the transistors on and off may allow for different paths of power/current which may result in actuation of the solenoid as herein described. For example, first and fourth transistors may be turned on in order to actuate the solenoid in a first way while turning on second and third transistors to actuate the solenoid in a second way.

The technical effect of detecting the spool position of a hydraulic valve using a single bi-directional solenoid actuator based on a change in inductance as indicated during a turn-off pulse is that hysteresis may be reduced as both a sensor and a reading element for the sensor are removed from the valve system. Further, the addition of the PID controller may provide the ability to close the loop on position determination which further reduces hysteresis. Additionally, the lack of a sensor and reading element may reduce the footprint of the system, such as the overall dimensions and weight of the valve. Additionally, connection complexity may be reduced and communication may be increased by way of the controller including a CAN BUS.

The disclosure also provides support for a hydraulic valve system, comprising: a hydraulic solenoid valve comprising a valve body and a spool, a bi-directional actuator, and a controller with instructions stored thereon to determine a position of the spool via inductance variance of the bi-directional actuator. In a first example of the system, the bi-directional actuator is a bi-directional solenoid actuator. In a second example of the system, optionally including the first example, the hydraulic solenoid valve comprises a four-way, three-position directional control valve. In a third example of the system, optionally including one or both of the first and second examples, the controller determines the inductance variance during a turn-off pulse of the bi-directional actuator. In a fourth example of the system, optionally including one or more or each of the first through third examples, determining the position of the spool comprises:

determining resistance variation of the bi-directional actuator during turn-on, determining values of one or more overvoltage decay characteristics based on the resistance variation, comparing the values of the one or more overvoltage decay characteristics to reference values stored in memory of the controller, and based on comparison with reference values, determining the position of the spool. In a fifth example of the system, optionally including one or more or each of the first through fourth examples, the controller includes a controller area network (CAN) BUS configured to control actuation of the bi-directional actuator.

The disclosure also provides support for a method for a hydraulic valve, comprising: determining resistance variance of a push-pull actuator configured to alter a position of a spool of the hydraulic valve, determining, based on the resistance variance, values of one or more overvoltage decay characteristics, determining, based on comparison of the values of the one or more overvoltage decay characteristics to reference values, the position of the spool of the hydraulic valve. In a first example of the method, the one or more overvoltage decay characteristics include a time delay between a peak voltage at transistor turn-off and a predefined voltage level and a waveform of the overvoltage decay. In a second example of the method, optionally including the first example, the time delay is determined by a voltage comparator and the waveform of the overvoltage decay is acquired by a digital-analog converter, the voltage comparator and the digital-analog converter being included in an electronic card. In a third example of the method, optionally including one or both of the first and second examples, the push-pull actuator is a bi-directional solenoid actuator. In a fourth example of the method, optionally including one or more or each of the first through third examples, the bi-directional solenoid actuator is driven by an H-bridge circuit. In a fifth example of the method, optionally including one or more or each of the first through fourth examples, the method further comprises: monitoring operation of the push-pull actuator, detecting a turn-off pulse of the push-pull actuator, and determining the values of the one or more overvoltage decay characteristics during the turn-off phase. In a sixth example of the method, optionally including one or more or each of the first through fifth examples, the resistance variance is determined during a turn-on phase. In a seventh example of the method, optionally including one or more or each of the first through sixth examples, the hydraulic valve does not comprise a position sensor.

The disclosure also provides support for a hydraulic smart valve, comprising: a valve body, a spool positioned within the valve body, the spool having three positions including a first position, a central, neutral position, and a third position, and a bi-directional actuator configured to move the spool among the three positions within the valve body. In a first example of the system, a position of the spool is determined via evaluation of overvoltage decay characteristics of the bi-directional actuator. In a second example of the system, optionally including the first example, the system further comprises: a controller configured to control actuation of the bi-directional actuator and to determine spool position based on the overvoltage decay characteristics. In a third example of the system, optionally including one or both of the first and second examples, the bi-directional actuator comprises an embedded magnet. In a fourth example of the system, optionally including one or more or each of the first through third examples, the controller includes a proportional-integral-derivative (PID) and a controller area network (CAN) BUS. In a fifth example of the system, optionally including one or more or each of the first through fourth examples, the valve is a 4/3 directional control valve.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic valve system, comprising:

a hydraulic solenoid valve comprising a valve body and a spool;

a bi-directional actuator;

a voltage comparator configured to determine a time delay between an overvoltage peak at transistor turn-off and a predefined voltage level;

a digital-analog converter configured to sample voltage values during overvoltage decay to determine a waveform of the overvoltage decay; and a controller with instructions stored thereon to determine a position of the spool via inductance variance of the bi-directional actuator, comprising:

determining resistance variation of the bi-directional actuator during turn-on;

during a turn-off phase, determining values of one or more overvoltage decay characteristics based on the resistance variation;

comparing the values of the one or more overvoltage decay characteristics to reference values stored in memory of the controller; and based on comparison with reference values, determining the position of the spool.

2. The hydraulic valve system of claim 1, wherein the bi-directional actuator is a bi-directional solenoid actuator.

3. The hydraulic valve system of claim 1, wherein the hydraulic solenoid valve comprises a four-way, three-position directional control valve.

4. The hydraulic valve system of claim 1, wherein the controller determines the inductance variance during a turn-off pulse of the bi-directional actuator.

5. The hydraulic valve system of claim 1, wherein the controller includes a controller area network (CAN) BUS configured to control actuation of the bi-directional actuator.

6. A method for a hydraulic valve, comprising:

determining resistance variance of a push-pull actuator configured to alter a position of a spool of the hydraulic valve;

determining, based on the resistance variance, values of one or more overvoltage decay characteristics;

determining, based on comparison of the values of the one or more overvoltage decay characteristics to reference values, the position of the spool of the hydraulic valve, wherein the one or more overvoltage decay characteristics include a time delay between a peak voltage at transistor turn-off and a predefined voltage level and a waveform of the overvoltage decay.

7. The method of claim 6, wherein the time delay is determined by a voltage comparator and the waveform of the overvoltage decay is acquired by a digital-analog converter, the voltage comparator and the digital-analog converter being included in an electronic card.

8. The method of claim 6, wherein the push-pull actuator is a bi-directional solenoid actuator.

9. The method of claim 8, wherein the bi-directional solenoid actuator is driven by an H-bridge circuit.

10. The method of claim 6, further comprising:

monitoring operation of the push-pull actuator;

detecting a turn-off pulse of the push-pull actuator; and determining the values of the one or more overvoltage decay characteristics during the turn-off phase.

11. The method of claim 6, wherein the resistance variance is determined during a turn-on phase.

12. The method of claim 6, wherein the hydraulic valve does not comprise a position sensor.

13. A hydraulic smart valve, comprising:

a valve body;

a spool positioned within the valve body, the spool having three positions including a first position, a central, neutral position, and a third position; and a bi-directional actuator configured to move the spool among the three positions within the valve body, wherein a position of the spool is determined via evaluation of overvoltage decay characteristics of the bi-directional actuator during a turn-off phase, and wherein the position of the spool is determined without a position sensor or a reading element.

14. The hydraulic smart valve of claim 13, further comprising a controller configured to control actuation of the bi-directional actuator and to determine spool position based on the overvoltage decay characteristics.

15. The hydraulic smart valve of claim 13, wherein the bi-directional actuator comprises an embedded magnet.

16. The hydraulic smart valve of claim 15, wherein the controller includes a proportional-integral-derivative (PID) and a controller area network (CAN) BUS.

17. The hydraulic smart valve of claim 13, wherein the valve is a 4/3 directional control valve.

* * * * *